June 19, 1945.  H. H. MERWIN  2,378,568

MATERIAL HANDLING APPARATUS

Filed Oct. 8, 1943  7 Sheets-Sheet 4

INVENTOR
H. H. MERWIN
BY
E. R. Nowlan
ATTORNEY

June 19, 1945. H. H. MERWIN 2,378,568
MATERIAL HANDLING APPARATUS
Filed Oct. 8, 1943 7 Sheets-Sheet 5
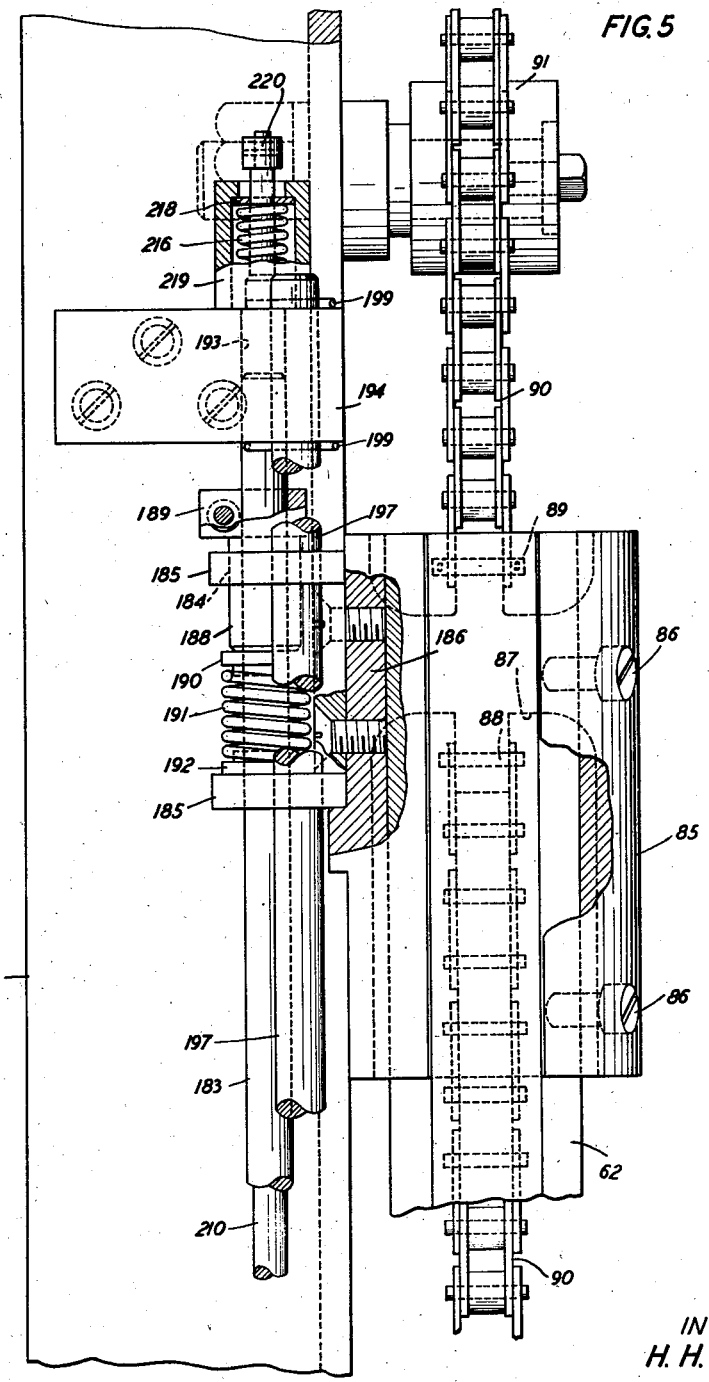
INVENTOR
H. H. MERWIN
BY
E. R. Nowlan
ATTORNEY June 19, 1945.  H. H. MERWIN  2,378,568

MATERIAL HANDLING APPARATUS

Filed Oct. 8, 1943  7 Sheets-Sheet 6

INVENTOR
H. H. MERWIN
BY
E. R. Nowlin
ATTORNEY

June 19, 1945.  H. H. MERWIN  2,378,568
MATERIAL HANDLING APPARATUS
Filed Oct. 8, 1943  7 Sheets-Sheet 7
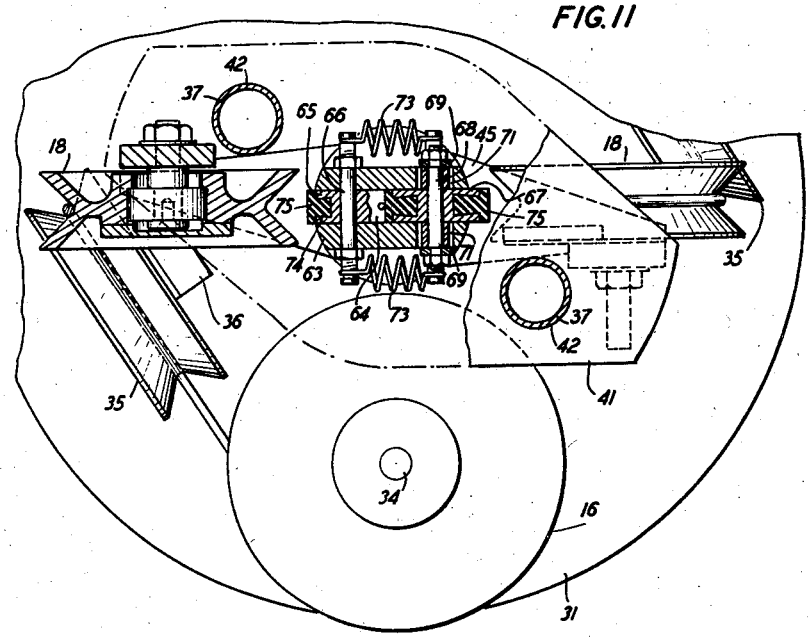
FIG. 11
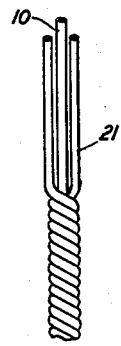
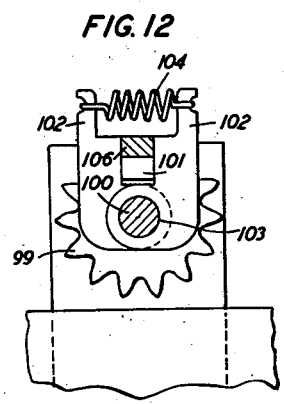
FIG. 12
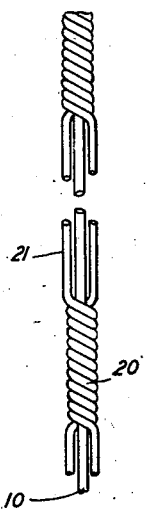
FIG. 13
INVENTOR
H. H. MERWIN
BY
E. R. Nowlan
ATTORNEY Patented June 19, 1945

2,378,568

UNITED STATES PATENT OFFICE 2,378,568

MATERIAL HANDLING APPARATUS

Harry H. Merwin, Rutherford, N. J., assignor to Western Electric Company, Incorporated, New York, N. Y., a corporation of New York Application October 8, 1943, Serial No. 505,487

20 Claims. (Cl. 57—6)

This invention relates to material handling apparatus, and more particularly to apparatus for serving electrical conductors to a textile core.

Cable core balancing units employed in the communications arts may include a length of textile core with a pair of insulated electrical conductors spirally wound thereon, the ends of the conductors being of desired lengths for electrical connections with other units.

An object of the invention is to provide a material handling apparatus which is particularly adapted and efficient in forming of cable core balancing units.

With this and other objects in view, the invention comprises a flier rotatable about an advancing core and including a serving head movable axially of the core, to serve spiral windings of material thereon in one direction and movable in the reverse direction to produce substantially straight portions of the material adjacent the core.

Other objects and advantages will be apparent from the following detailed description when considered in conjunction with the accompanying drawings, wherein Fig. 1 is a side elevational view of the apparatus;

Fig. 5 is a fragmentary sectional view taken substantially along the line 5—5 of Fig. 4;

Fig. 9 is a fragmentary sectional view taken substantially along the line 9—9 of Fig. 3;

Fig. 10 is a schematic illustration of the apparatus;

Fig. 11 is a fragmentary horizontal sectional view taken substantially along the line 11—11 of Fig. 2;

Fig. 12 is a fragmentary detail view taken along the line 12—12 of Fig. 3; and

Fig. 13 illustrates the product of the apparatus.

Figure 1:
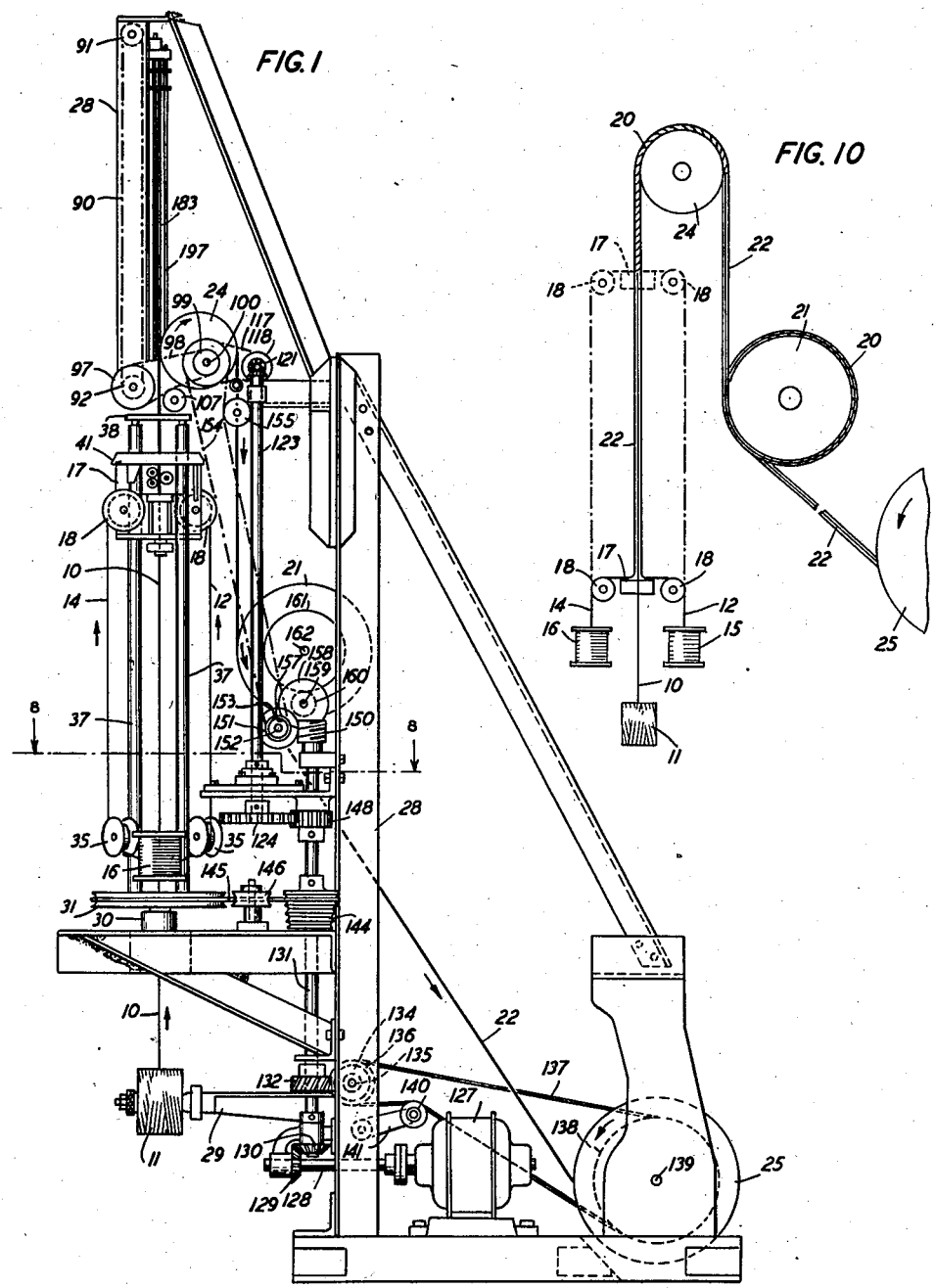

Referring now to the drawings, attention is first directed to Figs. 10 and 12. Referring first to Fig. 10, broadly the apparatus includes a flier rotatable about an advancing core 10 which is withdrawn from a supply 11. In the present instance the core 10 is a fabric cord and upon this cord strands, such as insulated electrical conductors 12 and 14 from supply reels 15 and 16, are to be served at intervals to the core during the constant advancement of the core. This is accomplished through a serving head indicated generally at 17 and including sheaves 18 about which the strands travel toward the core. The flier, including the supply reels 15 and 16 and the serving head 17, rotates continuously about the core and during this rotation the serving head 17 is moved axially of the core but at a lower rate of speed than the core to spirally wind the strands 12 and 14 on the core. This occurs during the movement of the serving head from the solid line position shown in Fig. 10 to the dotted line position shown therein, during which time the strands are spirally wound on the core. However, upon the serving head reaching its uppermost position, means is operated to cause a rapid return movement of the serving head to its lowermost position and thus contrary to the direction of travel of the core, to lay substantially parallel lengths of the strand adjacent the core, after which another spiral winding of the strands will be formed thereon.

In the schematic illustration in Fig. 10 the serving head has just been lowered after laying substantially straight portions of the strand adjacent the core, prior to which, for a given length of the core as indicated at 20, the strands were spirally wound thereon. The reference numeral 20 indicates another spirally wound section of the strands adjacent a capstan 21 which is utilized for the advancement of the core and the strands served thereto. Portions 22 indicate the substantially straight lengths of strands adjacent the core. Thus in this illustration, during the advancement of the core through the flier and the serving head, material is intermittently spirally wound on the core and laid substantially parallel thereto, after which the formed structure passes over a sheave 24 about the capstan 21 and onto a takeup reel 25.

Figure 8:
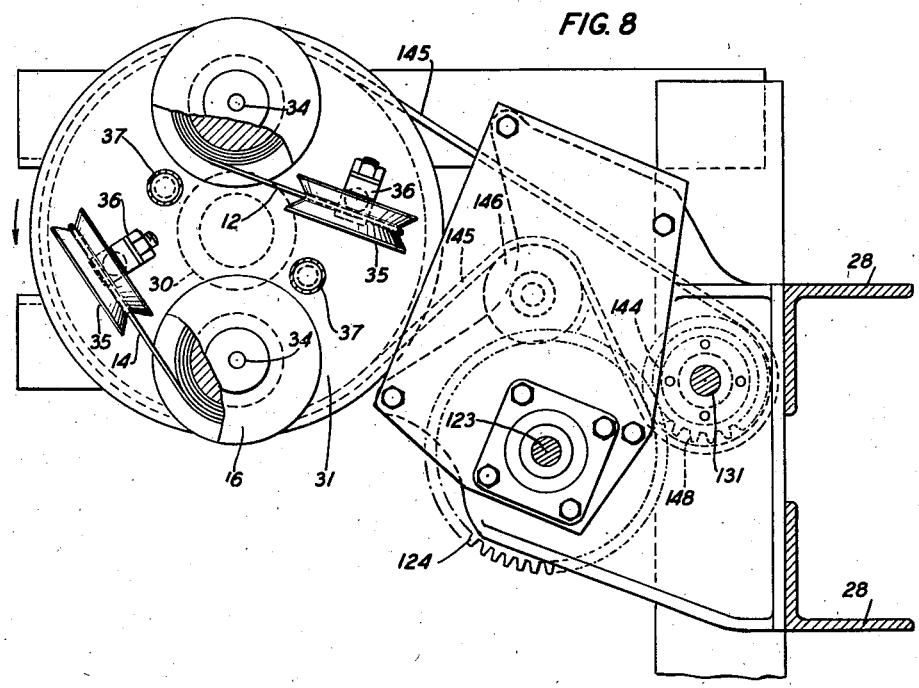
Fig. 8 is an enlarged horizontal sectional view taken along the line 8—8 of Fig. 1.

Considering now the specific structure of the apparatus, attention is directed to Fig. 1, which illustrates a frame structure 28 to support the various operating units of the apparatus. The supply 11 for the core 10 is rotatably supported by a bracket 29 mounted upon the frame 28. The core 10 travels upwardly to the sheave 24 through a hollow rotatable support 30 for a driven head 31 of the flier. This portion of the flier is shown in Fig. 8, the periphery of the head 31 being grooved to receive a belt 32 which is operatively connected to its driving means which will hereinafter be described. The supply reels 15 and 16 are rotatably and removably mounted upon the head 31 as at 34. The strands 12 and 14 from the supply reels are directed around sheaves 35 which are rotatably supported by suitable means 36 upon the head 31. The sheaves 35 are positioned to receive the strands from their respective reels and direct the strands vertically at diametrically opposed positions. Rods 37 are fixed at their lower ends to the head 31 and extend vertically as shown in Figs. 1 and 2, their upper ends being connected to the rotatable head 38 as at 39.

Figure 2:
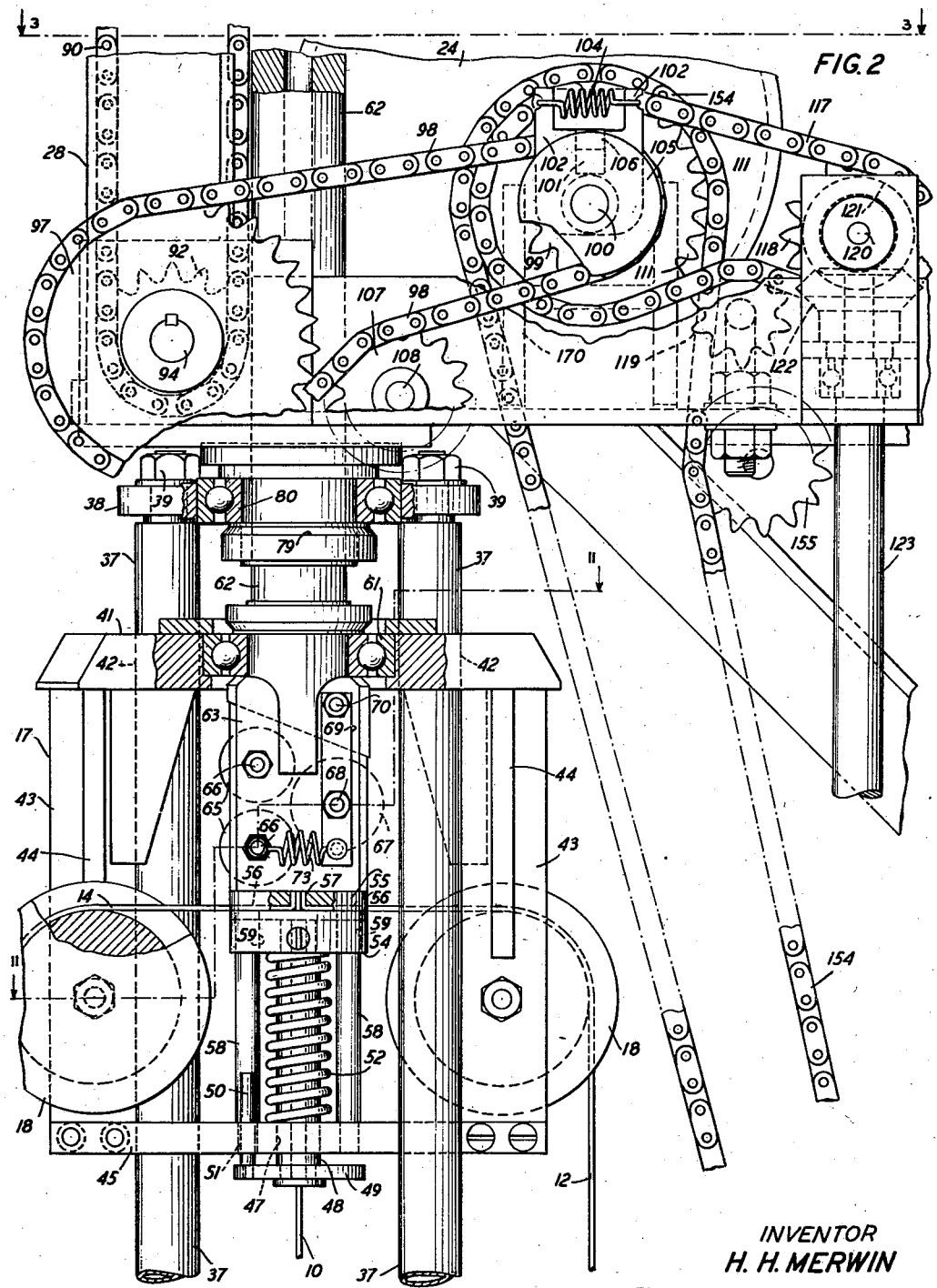
Fig. 2 is an enlarged fragmentary detailed view of an intermediate portion of the apparatus.

The serving head 17 shown in Figs. 1, 2 and 11 has an upper member 41 of the contour illustrated in Fig. 11, a portion of the member in this figure being in solid lines while the remaining portion, to illustrate the contour thereof, is shown in dot and dash lines. Apertures 42 are provided in the member 41 for the rods 37, and through this connection the serving head 17 is caused to rotate with the flier which includes the rod 37, the support 30 and the rotatable head 38, and also move longitudinally thereof. Downwardly projecting members 43, having their upper ends fixed to the member 41 and reenforced through the aid of members 44, have their lower ends connected to a lateral member 45 of the contour illustrated in Fig. 11. The central and widest portion of the member 45 is centrally apertured, as at 47, to receive a hollow or tubular member 48 through which the core 10 passes in its travel toward the sheave 24. A collar 49, fixed to the lower end of the hollow member 48, supports a pin 50 receivable in an aperture 51 of the member 45, to lock the collar and hollow member against rotation. A spring 52, disposed concentric with the hollow member 48 between the member 45 and a serving element 54, which is mounted upon the upper end of the hollow member, normally urges the element upwardly into engagement with a companion serving element 55. The element 54 is grooved, as at 56, to provide passageways for the strands 12 and 14. The element 55 is also centrally apertured at 57 to allow for passage therethrough of the core 10 and for the spiral wrappings of the strands 12 and 14 on the core. Vertical rods 58, mounted upon the member 45 and fixed at their upper ends to the element 55, serve to support the latter and to hold the element 54 for registration therewith by passing through apertures 59 in the element. Another purpose for the pin 50 is to hold the element 54 in open position away from the element 55 during the threading of the strands to the core, this being made possible by the manual movement of the hollow member 48 through the aid of the collar 49 downwardly against the force of the spring 52 until the pin is out of its aperture 51 and the collar and hollow member turned to move the pin out of registration with its aperture and for abutting engagement with the member 45.

The sheaves 18, about which the strands 12 and 14 are directed, are rotatably mounted upon the members 43 of the serving head and, as will be noted by viewing Fig. 11, the sheaves 18 are positioned with the inner portions of their grooves in vertical alignment with the inner portions of the grooves of the sheaves 35, to assist in maintaining parallel alignment of the strands in their travel longitudinally of the wire.

The serving head 17 is rotatably supported, through the aid of a bearing 61 disposed in a central aperture of the end member 41, upon a reciprocable spindle 62. The spindle 62 has a widened portion 63 disposed within the serving head and extending to the element 55. The portion 63 of the spindle has a central cutaway portion 64 (Fig. 11) to rotatably receive, at one side thereof, a pair of rollers 65 rotatably mounted upon stationary spindles 66, and a single roller 67 disposed at the other side thereof rotatably supported by a spindle 68. The spindle 68 is supported by arms 69, which in turn are pivotally supported at 70 at their upper ends, to allow for movement of the roller 67 toward or away from the rollers 65. By viewing Fig. 11, it will be noted that enlarged apertures 71 are provided for the lower spindle portion 63, to compensate for the movement of the roller 67. Springs 73, connecting the lower ends of the arms 69 with the lowermost spindle 66, as illustrated in Figs. 2 and 11, normally urge the roller 67 toward the rollers 65. The rollers 65 and 67 are substantially identical in structure excepting for the variations in size between the roller 67 and the like rollers 65. They all have their central metallic portions 74 made hollow, to receive resilient inserts 75 which extend over the peripheries thereof and provide resilient portions for engaging the strands after they are spirally wound on the core, to assist in laying the strands on the core.

Figures 4, 6:
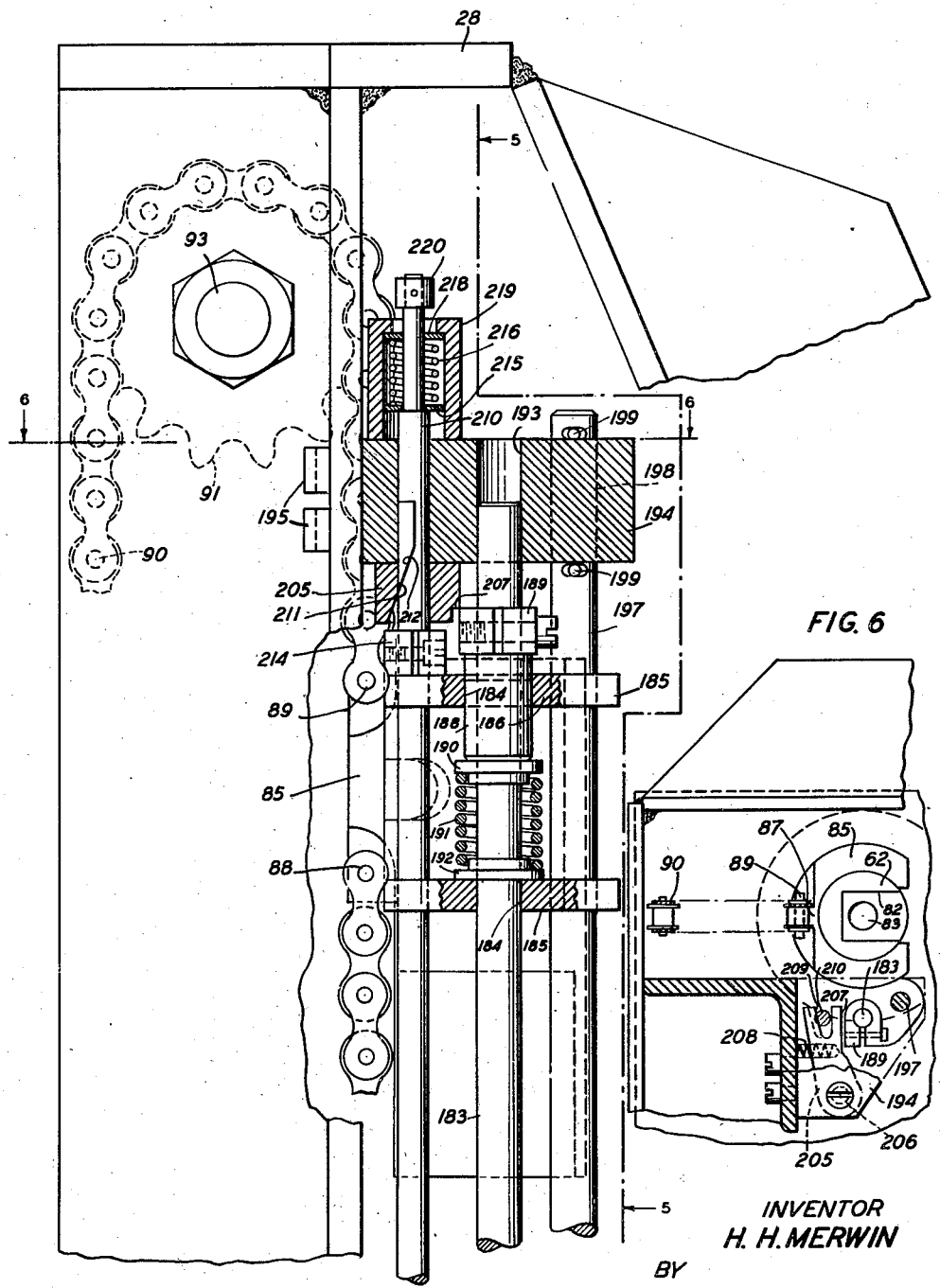
Fig. 4 is an enlarged fragmentary detail view of the upper portion of the apparatus.
Fig. 6 is a fragmentary horizontal sectional view taken substantially along the line 6—6 of Fig. 4.

The spindle 62 is also disposed in a sleeve 79 carried by a bearing 80 supported in the rotatable head 38 of the flier, to assist in the free rotation of the flier relative to the spindle, the latter being held against rotation. The spindle extends from the central portion of the serving head for a considerable distance above the flier, its length depending upon the distance of travel desired for the serving head. The cross-sectional contour of the spindle 62 is shown in Fig. 6, it being cylindrical except for the provision of a substantially rectangular groove 82 therein, to allow for the sheave 24. The spindle is also centrally apertured, at 83, at the lower portion thereof, where the groove 82 is not present, to allow for the passage of the article, namely the core and strands. A collar 85 (Figs. 5 and 6) is fixed to the outer end of the spindle 62, as at 86, and has a reduced portion 87 to which the ends 88 and 89 of a chain 90 are secured. The chain 90 passes around sprockets 91 and 92 (Figs. 1, 2 and 4), the sprocket 91 being rotatably supported by a shaft 93 carried by the frame 28, while the sprocket 92 is keyed to a shaft 94.

Figure 7:
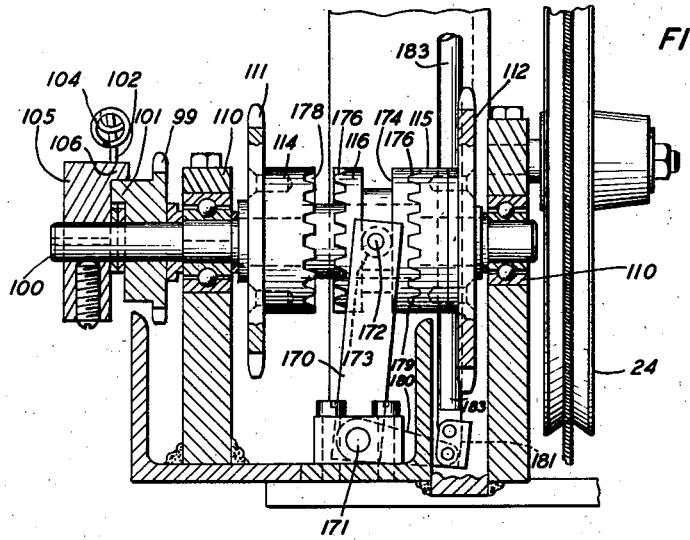
Fig. 7 is a fragmentary sectional view taken substantially along the line 7—7 of Fig. 3.

The shaft 94 is rotatably mounted on suitable bearings 96 (Fig. 3) and has a sprocket 97 mounted upon the outer end thereof. A chain 98 connects the sprocket 97 with a sprocket 99, which is disposed upon but not fixed to a shaft 100. The sprocket 99 (Figs. 7 and 12) has an integral lug 101 projecting between a pair of connecting elements 102, which are freely mounted, as at 103, on the shaft 100 and have their outer ends normally urged toward each other by a spring 104. A collar 105, fixed to the shaft 100, has a similar integral lug 106 projecting between the elements 102, and through this means a flexible connection is provided between the sprocket 99 and the shaft 100.

Attention at this point is directed to a sprocket 107 rotatably supported upon an arm 108 and adjustably mounted, at 109, for engagement with the chain 98, to maintain the chain sufficiently taut on its sprockets.

The shaft 100 is rotatably supported in suitable bearings 110 and has sprockets 111 and 112 together with their clutch members 114 and 115 freely mounted thereon between the bearings. A central clutch element 116, keyed to the shaft 100 for rotation therewith, is adapted for movement axially of the shaft, to operatively connect either sprocket 111 or 112, through its clutch member, with the shaft. The shaft 111 is operatively connected, through the aid of a chain 117, to a sprocket 118, assisted by an idler sprocket 119. The sprocket 118 is fixedly mounted upon a shaft 120, which is journalled in suitable bearings and has a bevelled gear 121 mounted thereon. The bevelled gear 121 interengages a similar bevelled gear 122 which is mounted upon the upper end of a vertical shaft 123 (Figs. 1 and 2) which extends downwardly through suitable bearings and has a gear 124 mounted upon the lower end thereof.

Attention is now directed to the power means which, in the present instance, is an electric motor 127 mounted upon the base of the frame 28 and controlled through a suitable electrical circuit not shown. A shaft 128 of the motor 127 has a bevelled gear 129 mounted thereon which interengages a similar bevelled gear 130, the latter being fixed to a vertical shaft 131. The bearings and bracket supports for the various shafts are not specifically described but are illustrated in the drawings. A worm gear 132, fixedly mounted on the shaft 131, interengages a worm gear 134 to drive a shaft 135 upon which the gear 134 is mounted. A pulley 136, fixed to the shaft 135, is connected by a belt 137, shown schematically in Fig. 1, to a pulley 138. The pulley 138 is mounted upon a shaft 139 which supports the takeup reel 25, to drive the takeup reel in the direction of the arrow. An idler pulley 140, supported by a bracket 141 and normally urged upwardly by a spring or other suitable means (not shown), maintains the belt 137 sufficiently taut and also causes application of desired tension on the article between the capstan 21 and the takeup reel 25.

Returning to the shaft 131, it will be noted that a multi-grooved cone-shaped sheave 144, adjustably mounted upon the shaft, is adapted to drive the head 31 of the flier, through the aid of a belt 145 and an idler sheave 146. Through the selection of varied grooves in the sheave 144, the flier may be rotated at varied speeds with respect to the advancement of the core 10, to vary the spiral windings of the strands 12 and 14 thereon.

A pinion 148, fixed to the shaft 131, interengages the gear 124 to drive the shaft 123. Thus the driving means has been connected to the sprocket 111 for rapidly moving the serving head 17 downwardly. When the shaft 100 is connected to the sprocket 112 through the clutch element 116 and the clutch member 115, the serving head 17 is moved upwardly at a predetermined speed which is much slower than the lowering or return speed of movement of the serving head. In connecting the driving means with the sprocket 112, attention is again directed to the shaft 131, where, at the upper end thereof, a worm 150 is mounted for interengagement with a worm gear 151 of a shaft 152, on which is mounted a sprocket 153. A chain 154 (Figs. 1 and 2) operatively connects the sprocket 153 with the sprocket 112, which is shown in detail in Fig. 7 and also in Fig. 3. An idler sprocket 155, suitably mounted for interengagement with the chain 154, maintains the chain sufficiently taut upon its sprockets.

Attention is again directed to the shaft 131, where a driving connection is provided for the capstan 21 through the worm 150, the worm gear 151 and the shaft 152 upon which a pinion 157 is mounted. The pinion 157 interengages a gear 158, the latter being mounted upon a shaft 159 which supports and has fixed thereto a pinion 160 which interengages a gear 161 of a shaft 162, the latter supporting both the gear 161 and the capstan 21. The capstan 21 is of the spiral groove type, about which several convolutions of the article are wound when received from the sheave 24 and prior to the passing of the article to the takeup reel 25.

The mechanism for controlling the clutch element 116 for reversing the travel of the serving head 17 is illustrated in Figs. 1, 3, 4 and 7. Viewing first Fig. 7, a yoke 170 is shown mounted upon a shaft 171 and supporting pins 172 in the upper ends thereof which support rollers 173 positioned to ride in an annular groove 174 of the clutch element 116. The clutch element is provided with teeth 176 upon each face thereof for interengagement with teeth 178 and 179 of the clutch members 114 and 115, respectively. The clutch element, as previously described, is keyed to the shaft 100 and through the interengaging teeth, the element may be positively engaged with either sprocket 111 or 112. A lever 180, fixed to the rocking shaft 171, has its outer end connected through a link 181 to a shifting rod 183. The shifting rod 183 extends vertically from the connecting link 181 through apertures 184 in parallel brackets 185 which are fixed to the collar 85 (Figs. 4 and 5) as indicated at 186. The upper aperture 184 (Figs. 4 and 5) is of sufficient size to receive a sleeve portion 188 of an adjustable abutting member 189, the latter being fixed at a desired position upon the shifting rod 183. Beneath the sleeve portion 188 is a collar 190 disposed concentric with the rod 183 formed to rest upon the upper end of a compression spring 191. A similar collar 192 is disposed concentric with the rod 183 and adapted to receive the lower end of the spring 191. The upper end of the rod 183 is movably disposed in an aperture 193 of a bracket 194, the latter being fixed as at 195 to the frame structure 28. A guide rod 197, having its upper end disposed in an aperture 198 of the bracket 194, is held in place therein by pins 199. The rod 197 extends through apertures in the brackets 185 and has its lower end (Fig. 9) disposed in an aperture 200 of a bracket 201, the latter being fixedly mounted, as at 202, upon the adjacent portion of the frame structure 28. The guide rod 197 thus mounted serves in guiding the collar 85 during its vertical movement and through the connection of the guide rod with the brackets 185 the collar is held against rotation.

Latching means is provided adjacent the brackets 194 and 201, to cooperate with the shifting rod 183 to actuate the clutch mechanism at the ends of the travel of the serving head. Considering first the upper latching means, attention is directed to Figs. 4 and 6. An upper latch 205, pivotally supported at 206 upon the bracket 194, has a shoulder 207 adapted to extend over the adjacent upper edge of the abutting member 189. The latch 205 is normally urged toward the shifting rod 183 to form latching engagement with the abutting member through the aid of a spring 208. The free end of the latch 205 is bifurcated, as at 209, to straddle a latch releasing rod 210 through the cooperation of cam-like tapered surfaces 211 and 212 of the latch and releasing rod, respectively.

In the illustration shown in Fig. 4, a collar 214 fixed to the releasing rod 210 has been engaged by the upper bracket 185 and the collar 85, to move the releasing rod 210 upwardly to move the latch 205 out of engagement with the abutting member 189, allowing force stored in the spring 191 to move the shifting rod 183 upwardly to bring about shifting of the clutch mechanism. During the upward movement of the releasing rod 210 a disc member 215 carried thereby causes compression of a spring 216 to urge the releasing rod 210 downwardly to condition the latch 205 to be moved about its spring 208 into latching position. Upon movement of the shifting rod 183, another disc member 218 disposed concentric with a reduced portion of the releasing rod 210, is positioned with the spring and other disc member in a housing 219 fixed to the bracket 194 and apertured to receive a collar 220 mounted upon the upper end of the shifting rod 210. The spring 216 provides a neutralizing force to be applied to the shifting rod 210 after each clutch actuating operation. The spring 191 provides the force for shifting the clutch element 116 in either position, as will be set forth in the description of the lower latching means.

Figure 3:
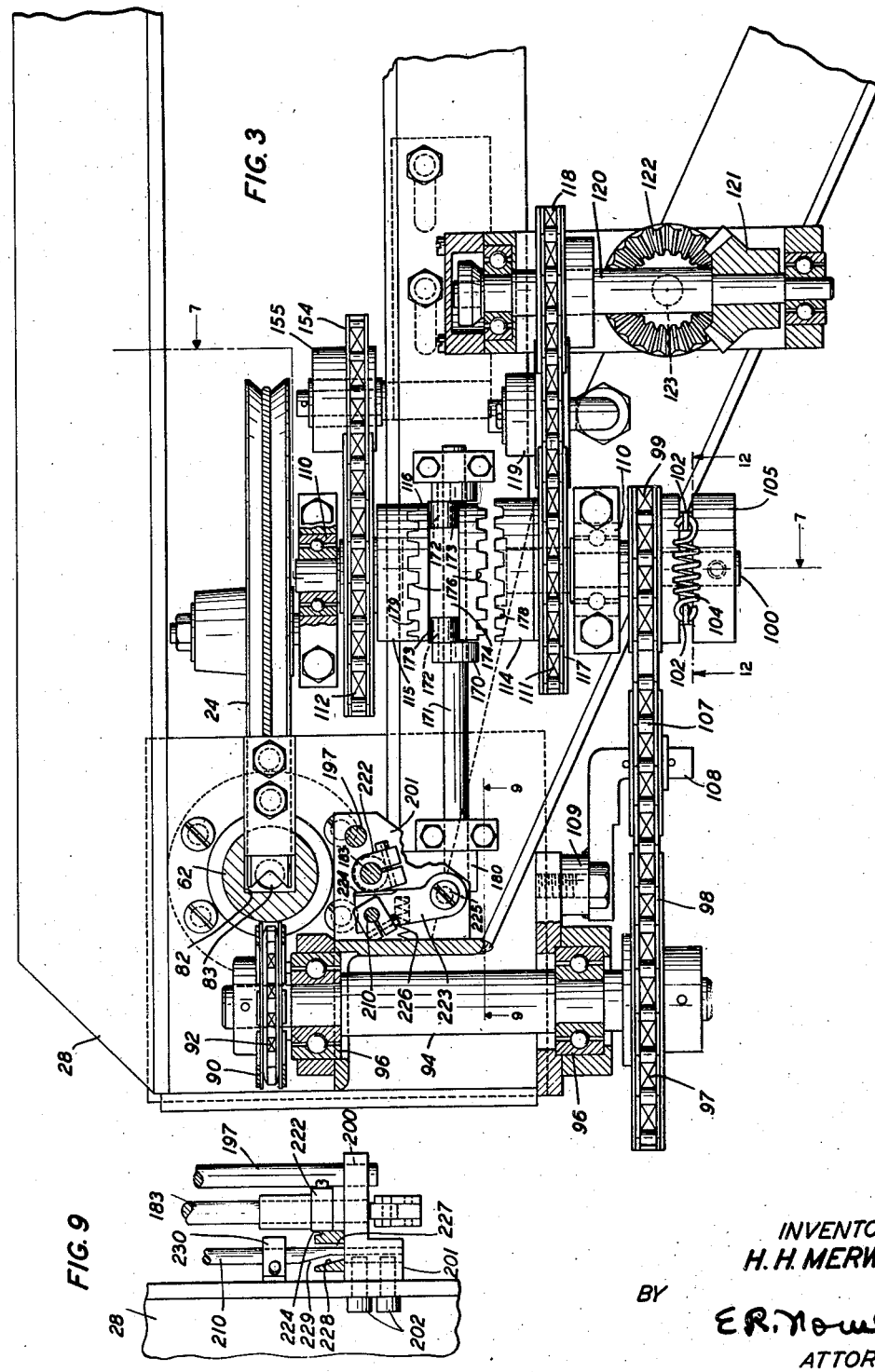
Fig. 3 is a horizontal sectional view taken substantially along the line 3—3 of Fig. 2.

Referring now to the lower latching means shown in Figs. 3 and 9, it will be apparent that an abutting member 222, similar to the abutting member 189, is fixed to the shifting rod 183 adjacent the lower end thereof. A latch 223, substantially identical in structure to the latch 205 excepting the provision of a shoulder 224 at the upper side thereof instead of at the under side as is the construction of the latch 205, is pivotally supported at 225 upon the bracket 201. The latch 223 is normally urged toward the shifting rod 183 by a spring 226 and has a bifurcated end 227 provided with a tapered cam-like surface 228 adapted to cooperate with a similar tapered cam-like surface 229 of the releasing rod 210. As previously stated, the spring 216 functions for the lower latching mechanism and is compressed by the collar 220 engaging the disc member 218 during downward movement of the releasing rod 210 by the engagement of the lower bracket 185 with a collar 230 adjustably mounted upon the releasing rod as shown in Figs. 3 and 9.

Considering now the operation of the apparatus, attention is again directed to Fig. 10, which illustrates schematically the principle of operation of the apparatus. During rotation of the capstan 21 the finished article illustrated in Fig. 13 is advanced and is wound upon the takeup reel 25. During this advancement of the article the core 10 is withdrawn from the supply 11 and moved vertically through the flier and the serving head 17 therein. The flier and serving head are rotated at a given speed and during this rotation the serving head together with the supply reels 15 and 16 for the strands 12 and 14 are rotated about the core. Starting at the lowermost position adjacent the supply reels, the serving head serves or spirally winds the strands 12 and 14 about the core, the serving head moving vertically in the flier with the core but at a slower rate of speed than the advancement of the core, to provide the spiral windings of the strands about the core. When the serving head reaches its upper limit the clutch mechanism is actuated, disconnecting the means for moving the serving head from one driving mechanism to another to rapidly return the serving head toward the supply reels, forming substantially straight parallel strand portions 235 between spirally wound sections 236 of the article, as illustrated in Fig. 13.

Referring to the other figures, beginning with Fig. 1, it is believed that the two driving means interposed between the motor 127 and the sprocket 111 for driving the serving head downwardly at a rapid rate of speed, and the driving mechanism connected with the sprocket 112 for moving the serving head upwardly at a slower rate of speed, are understood. With the serving head in the position shown in Figs. 1 and 2, the latch mechanism shown in Figs. 4 and 6 is about to be released, the latch 205 being moved out of engagement with the abutting member 189 to allow the force stored in the spring 191 to move the shifting rod 183 upwardly to rock the lever 180 (Fig. 7) counterclockwise to move the yoke 170 to move the clutch element 116 out of engagement with the sprocket 112 and into engagement with the clutch member 114 of the sprocket 111. Immediately, the driving of the shaft 100 is reversed and, through the flexible connection shown in Figs. 7 and 8, the direction of travel of the shaft 94 (Figs. 2 and 3) is reversed, causing the serving head to move downwardly. During this interval of time the serving head travels down the strands and they continue to be advanced to the serving elements 54 and 55 at a rate of speed equal that of the core, forming the substantially straight portions of the article as they pass between the rollers 65 and 67 with the core 10. When the serving head reaches its lowermost position, the collar 85 traveling with it will, through the upper bracket 185 carried thereby, cause compression of the spring 191 by engaging the collar 190, and upon the lower bracket 185 engaging the collar 230 to release the lower latch mechanism through downward movement of the releasing rod 210, the clutch mechanism will be actuated by a downward movement of the shifting rod 183, through the force of the spring 191, to return the clutch element 116 into engagement with the clutch member 115.

Although specific improvements of the invention have been shown and described, it will be understood that they are but illustrative and that various modifications may be made therein without departing from the scope and spirit of this invention as defined by the appended claims.

What is claimed is:

1. A material handling apparatus comprising means to longitudinally advance a core at a constant rate of speed, a rotatable and reciprocable unit for serving a strand to the core, means to rotate the unit to cause spiral winding of the strand for a given distance about the core, and means to reciprocate the unit to cause a given length of the strand to lay substantially parallel with the core.

2. A material handling apparatus comprising means to longitudinally advance a core at a constant rate of speed, a rotatable and reciprocable unit for serving a strand to the core, and means to cause reciprocation of the unit relative to the core to cause spiral winding of the strand about the core during travel of the unit in one direction and laying of the strand substantially parallel with the core during travel of the unit in the opposite direction.

3. A material handling apparatus comprising means to longitudinally advance a core at a constant rate of speed, a rotatable and reciprocable unit for serving a strand to the core, means to cause rotation of the unit, and means to cause reciprocation of the unit relative to the core to cause spiral winding of the strand about the core during travel of the unit in one direction and laying of the strand substantially parallel with the core during travel of the unit in the opposite direction.

4. A material handling apparatus comprising means to longitudinally advance a core at a constant rate of speed, a rotatable and reciprocable unit for serving a strand to the core, means to cause rotation of the unit, means to move the unit in the direction of travel of the core to cause the unit to wind the strand spirally on the core, and means to move the unit in a reverse direction to cause the unit to lay the strand substantially parallel with the core.

5. A material handling apparatus comprising means to longitudinally advance a core at a given rate of speed, a rotatable and reciprocable unit for serving a strand to the core, means to cause rotation of the unit, means to move the unit in the direction of travel of the core and at a slower speed to cause the unit to spirally wind the strand about the core, and means to move the unit at a faster rate of speed and in the reverse direction to cause the unit to lay the strand substantially parallel with the core.

6. A material handling apparatus comprising means to longitudinally advance a core at a constant rate of speed, a rotatable and reciprocable unit for serving a strand to the core, means to cause rotation of the unit, means to move the unit in the direction of travel of the core to cause the unit to wind the strand spirally on the core, means to move the unit in a reverse direction to cause the unit to lay the strand substantially parallel with the core, and means to control said moving means to vary the lengths of the said spiral and straight portions of the strand.

7. A material handling apparatus comprising means to longitudinally advance a core, a rotatable and reciprocable unit for serving a strand to the core, means to cause rotation of the unit, power means, mechanism adapted to operatively connect the power means to the unit to cause movement of the unit in the direction of travel of the core to spirally wind a portion of the strand about the core, and mechanism adapted to operatively connect the power means to the unit to cause movement of the unit in a reverse direction to cause a portion of the strand to lay substantially parallel with the core.

8. A material handling apparatus comprising means to longitudinally advance a core, a rotatable and reciprocable unit for serving a strand to the core, means to cause rotation of the unit, power means, mechanism adapted to operatively connect the power means to the unit to cause movement of the unit in the direction of travel of the core to spirally wind a portion of the strand about the core, mechanism adapted to operatively connect the power means to the unit to cause movement of the unit in a reverse direction to cause a portion of the strand to lay substantially parallel with the core, and means to alternately render the said mechanisms effective.

9. A material handling apparatus comprising means to longitudinally advance a core, a rotatable and reciprocable unit for serving a strand to the core, means to cause rotation of the unit, power means, mechanism adapted to operatively connect the power means to the unit to cause movement of the unit in the direction of travel of the core to spirally wind a portion of the strand about the core, mechanism adapted to operatively connect the power means to the unit in a reverse direction to cause a portion of the strand to lay substantially parallel with the core, and variable means to alternately render the said mechanisms effective at variable intervals of time.

10. A material handling apparatus comprising means to longitudinally advance a core, a rotatable and reciprocable unit for serving a strand to the core, means to cause rotation of the unit, power means, mechanism adapted to operatively connect the power means to the unit to cause movement of the unit in the direction of travel of the core to spirally wind a portion of the strand about the core, mechanism adapted to operatively connect the power means to the unit to cause movement of the unit in a reverse direction to cause a portion of the strand to lay substantially parallel with the core, and means under the control of the unit to alternately render the said mechanism effective.

11. A material handling apparatus comprising means to longitudinally advance a core, a rotatable and reciprocable unit for serving a strand to the core, means to cause rotation of the unit, power means, mechanism adapted to operatively connect the power means to the unit to cause movement of the unit in the direction of travel of the core to spirally wind a portion of the strand about the core, mechanism adapted to operatively connect the power means to the unit to cause movement of the unit in a reverse direction to cause a portion of the strand to lay substantially parallel with the core, means to alternately render the said mechanisms effective, and means interposed between the last named means and the said mechanisms to cushion the starting portion of each movement of the unit.

12. A material handling apparatus comprising means to longitudinally advance a core, a rotatable and reciprocable unit for serving a strand to the core, means to cause reciprocation of the unit relative to the core to cause spiral winding of the strand about the core during travel of the unit in one direction and laying of the strand substantially parallel with the core during travel of the unit in the opposite direction, and means disposed in connection with the said reciprocating means to cushion ends of the reciprocating movements of the unit.

13. A material handling apparatus comprising a rotatable flier, a serving unit disposed in the flier, rotatable therewith and reciprocable therein, means to longitudinally advance a core and a strand longitudinally through the flier and unit, and means to reciprocate the unit in the flier to cause the unit to alternately spirally wind portions of the strand about the core and cause intermediate portions of the strand to lie substantially parallel with the core.

14. A material handling apparatus comprising a rotatable flier, a serving unit disposed in the flier, rotatable therewith and reciprocable therein, means to longitudinally advance a core and a strand longitudinally through the flier and unit, means to reciprocate the unit in the flier to cause the unit to alternately spirally wind portions of the strand about the core and cause intermediate portions of the strand to lie substantially parallel with the core, and means to vary the reciprocal travel of the unit in the flier to vary the lengths of the said portions.

15. A material handling apparatus comprising a rotatable flier, means to longitudinally advance a core through the flier, a strand supply disposed in the flier, a unit for serving the strand to the advancing core disposed in the flier, rotatable therewith and reciprocable therein, and means to reciprocate the unit in the flier to cause the unit to alternately spirally wind portions of the strand about the core and cause intermediate portions of the strand to lie substantially parallel with the core.

16. A material handling apparatus comprising a rotatable flier, means to longitudinally advance a core through the flier, a strand supply disposed in the flier, a unit for serving the strand to the advancing core disposed in the flier, rotatable therewith and reciprocable therein, and means to alternately cause movement of the unit with and opposing the direction of travel of the core to alternately cause spiral winding of portions of the strand about the core and laying of portions substantially parallel with the core.

17. A material handling apparatus comprising a rotatable flier, means to longitudinally advance a core through the flier, a strand supply disposed in and rotatable with the flier, a unit for serving the strand to the advancing core disposed in the flier, rotatable therewith and reciprocable therein, means to direct the strand to the unit, and means to reciprocate the unit in the flier to cause the unit to alternately spirally wind portions of the strand about the core and cause intermediate portions of the strand to lie substantially parallel with the core.

18. A material handling apparatus comprising a rotatable flier, means to longitudinally advance a core through the flier, a strand supply disposed in the flier adjacent one end thereof, a serving unit reciprocable in the flier and rotatable therewith, means to move the unit away from the supply at a rate of speed less than that of the core to cause the unit to spirally wind a portion of the strand about the core, and means to move the unit at a faster rate of speed toward the supply to cause a portion of the strand to lie substantially parallel with the core.

19. A material handling apparatus comprising means to longitudinally advance a core, a strand supply, a rotatable and reciprocable serving unit adapted to serve a strand to the core, means to move the unit away from the supply at a rate of speed slower than the travel of the core to cause spiral winding of a portion of the strand about the core, and means to move the unit at a rate of speed faster than that of the core toward the supply to cause a portion of the strand to lie substantially parallel with the core.

20. A material handling apparatus comprising means to longitudinally advance a core, a strand supply, a rotatable and reciprocable serving unit adapted to serve a strand to the core, means to direct the travel of the strand between the supply and unit, means to move the unit away from the supply at a rate of speed slower than the travel of the core to cause spiral winding of a portion of the strand about the core, and means to move the unit at a rate of speed faster than that of the core toward the supply to cause a portion of the strand to lie substantially parallel with the core.

HARRY H. MERWIN.